United States Patent
Kondo

(10) Patent No.: US 7,870,674 B2
(45) Date of Patent: Jan. 18, 2011

(54) PRODUCTION METHOD FOR OIL-IMPREGNATED SINTERED BEARING

(75) Inventor: Makoto Kondo, Matsudo (JP)

(73) Assignee: Hitachi Powdered Metals Co., Ltd., Chiba (JP)

( * ) Notice: Subject to any disclaimer, the term of this patent is extended or adjusted under 35 U.S.C. 154(b) by 999 days.

(21) Appl. No.: 11/658,700

(22) PCT Filed: Aug. 22, 2005

(86) PCT No.: PCT/JP2005/015206
§ 371 (c)(1),
(2), (4) Date: Jan. 29, 2007

(87) PCT Pub. No.: WO2006/022223
PCT Pub. Date: Mar. 2, 2006

(65) Prior Publication Data
US 2008/0189950 A1    Aug. 14, 2008

(30) Foreign Application Priority Data
Aug. 24, 2004 (JP) .............................. 2004-244091

(51) Int. Cl.
*B21D 53/10* (2006.01)
*F16C 33/02* (2006.01)
*F16C 33/10* (2006.01)

(52) U.S. Cl. ............... 29/898.13; 29/898.1; 29/898.11; 29/898.12; 29/898.14; 384/279; 384/902

(58) Field of Classification Search ............. 29/898.13, 29/898.12, 898.14, 898.1; 384/279, 902
See application file for complete search history.

(56) References Cited

U.S. PATENT DOCUMENTS

| 5,519,933 | A |   | 5/1996 | Sakashita et al. |
| 5,941,646 | A | * | 8/1999 | Mori et al. .................. 384/279 |
| 6,737,016 | B2 | * | 5/2004 | Shikata et al. ................ 419/27 |
| 6,846,109 | B2 | * | 1/2005 | Yoshimura et al. .......... 384/279 |
| 6,896,143 | B2 | * | 5/2005 | Usui et al. ................... 205/666 |

FOREIGN PATENT DOCUMENTS

JP    A 03-071944    3/1991

(Continued)

*Primary Examiner*—David P Bryant
*Assistant Examiner*—Sarang Afzali
(74) *Attorney, Agent, or Firm*—Oliff & Berridge, PLC

(57) ABSTRACT

An end surface 1a of sintered bearing 1 is abutted on a die 10 so that the sintered bearing 1 is mounted thereon, and a tool 40 is abutted on the other end surface 1b of the sintered bearing 1. While the sintered bearing 1 is pressed by the tool 40, high frequency vibration in an axial direction is supplied from a horn 30 to the tool 40 by operating a vibrator 20 so as to give repeated impacts to both end surfaces 1a and 1b of the sintered bearing 1, and pores of the end surfaces 1a and 1b are thereby sealed. The die 10 and the tool 40 have surfaces abutting the sintered bearing 1, and the surfaces have roughness of 0.4 s or less and hardness of HRA 60 or more, and the tool presses the sintered bearing at a pressure of 70 to 700 kPa. The high frequency vibration supplied to the tool 40 has a power of 50 to 3000 W/cm², and it has a frequency of 10 to 50 kHz.

5 Claims, 2 Drawing Sheets

FOREIGN PATENT DOCUMENTS

| | | |
|---|---|---|
| JP | A 06-238381 | 8/1994 |
| JP | A 08-033260 | 2/1996 |
| JP | A 11-051055 | 2/1999 |
| JP | A 2003-314554 | 11/2003 |
| SU | 1734952 A1 * | 5/1992 |

* cited by examiner

PRODUCTION METHOD FOR OIL-IMPREGNATED SINTERED BEARING

TECHNICAL FIELD

The present invention relates to an oil-impregnated sintered bearing which may be used as a bearing for various types of motors, and in particular relates to an oil-impregnated sintered bearing which can inhibit leakage of lubricating oil impregnated into an internal portion thereof, and can improve sliding properties of the sintered bearing.

BACKGROUND ART

In an oil-impregnated sintered bearing having pores into which lubricating oil is impregnated, a shaft which is inserted into the sintered bearing is rotated, and an oil pressure is thereby generated in the lubricating oil existing in a small gap between the shaft and a sliding surface which is an inner peripheral surface of the sintered bearing. The shaft is thereby supported by this oil pressure with high accuracy. However, in the condition of the sintered bearing, leakage of the lubricating oil is inclined to occur from a surface other than the sliding surface of the sintered bearing. In particular, the leakage of the lubricating oil easily occurs from an end surface of the sintered bearing, which is exposed on the outside thereof. When the leakage of the lubricating oil occurs, the oil pressure thereof decreases. Due to this, direct contact of the shaft and the bearing often occurs, frictional resistance increases and durability decreases.

In order to solve the above problems, a technique was conceived in which a sealing process is performed for sealing pores exposed on an end surface of the sintered bearing. For example, methods therefor have been proposed in which high frequency vibration is supplied to an end surface of a sintered bearing (see Japanese Unexamined Patent Application Publication No. Hei 8-33260 and Japanese Unexamined Patent Application Publication No. Hei 11-51055).

DISCLOSURE OF THE INVENTION

Problems Solved by the Invention

In the above methods in which the end surface is sealed by supplying high frequency vibration thereto, it is conceived that the sealing process can be reliably performed in a short period of time. However, in the methods in the above publications, only one end surface to which the high frequency vibration is directly supplied is sealed. Due to this, in order to seal both end surfaces of the sintered bearing, one end surface and then the other end surface respectively must be subjected to the same sealing process. That is, in order to seal both end surfaces, a work is set every time the end surface of a sintered bearing is sealed, so that the sealing process must be performed twice. Due to this, it is desirable that the number of the process be reduced.

Therefore, an object of the present invention is to provide a production method for an oil-impregnated sintered bearing of which both end surfaces can be sealed by a smaller number of processes, and which can improve productivity of the sintered bearing.

Means for Solving the Problems

According to one aspect of the present invention, a production method for an oil-impregnated sintered bearing includes: abutting one end surface of the sintered bearing on a die so as to mount the sintered bearing thereon and abutting a tool on the other end surface of the sintered bearing, wherein the one end surface and the other end of the sintered bearing have pores. The production method further includes supplying high frequency vibration to the tool so as to give repeated impacts to the one end surface and the other end surface of the sintered bearing while pressing the sintered bearing by the tool in the above condition of the sintered bearing, so that the pores of the one end surface and the other end surface are sealed. The die and the tool have surfaces abutting the sintered bearing, and the surfaces have roughness of not more than 0.4 s and hardness of not less than HRA 60. The tool presses the sintered bearing at a pressure of 70 to 700 kPa, and the high frequency vibration supplied to the tool has a power of 50 to 3000 $W/cm^2$, and has a frequency of 10 to 50 kHz. In a preferred embodiment of the present invention, the sintered bearing may have an axis, and the high frequency vibration may be supplied to the tool toward one direction selected from a direction parallel to the axis, a direction substantially perpendicular to the axis, and a circumferential direction around the axis.

In the present invention, the high frequency vibration is supplied to the tool, and the repeated impacts are given to the above other end surface which the tool abuts. Since the high frequency vibration is transmitted from the tool to the sintered bearing, the repeated impacts are simultaneously given to the above one end surface which abuts the die. Both end surfaces subjected to the high frequency vibration process in the above manner are worked little by little by the repeated vibration having high speed and short amplitude, plastic flow of the material of the sintered bearing occurs, and the pores exposed on both end surfaces are sealed in a short period of time. Both sealed end surfaces can be mirror-finished, and in a short process time of about 1 to 5 seconds, sufficient sealing can be performed. According to the present invention described above, since the sealing of both end surfaces of the sintered bearing can be simultaneously completed by one sealing process (the process for supplying the high frequency vibration) and the process time for one sealing process can be remarkably short, the productivity can be remarkably improved.

In the present invention, the conditions of the high frequency vibration process by the high frequency vibration are determined as described above, and the reasons for the above respective conditions are as follows.

The reason that the roughness and the hardness of the surfaces of the tool and the die are respectively not more than 0.4 s and not less than HRA 60 respectively is as described below.

By satisfying the above conditions, both end surfaces of the sintered bearing can be simultaneously sealed by one high frequency vibration process. Regarding the surface roughness, in the case in which the roughness exceeds 0.4 s, since plastic flow of the material also occurs in a pressing direction, a plastic flow occurs in a surface direction, so that the sealing of both end surfaces becomes easily insufficient, and roughness of the end surfaces subjected to the sealing process is large. In particular, this case is remarkable on the die side on which the vibration is not directly supplied. On the other hand, in the case in which the hardness is less than HRA 60, the process for sufficiently sealing both end surfaces takes a long period of time, and the die is easily worn by the repeated impacts due to the high frequency vibration. The long period of time for the sealing process and the easy wearing of the die result in a short lifetime of the die.

Regarding the hardness of the die, the harder the die, the more the wear of the die is inhibited, and it is therefore desirable that the die be harder. In particular, since a cemented carbide has hardness of 950 to 1800 HV and has ductility so as to be resistant to repeated impacts by the high frequency vibration, the die is preferably made of the cemented carbide. A ceramic and a CBN (Cubic Boron Nitride) have hardness higher than the cemented carbide, but have low ductility, so that a die made of a ceramic or a CBN has a short lifetime. On the other hand, an alloy tool steel and a high speed tool steel have high ductility, but have low hardness, so that the wear of the die easily occurs in comparison with the cemented carbide. Regarding the tool, in order to prevent generation of cracks due to the high frequency vibration directly supplied to the tool, the tool is preferably made of a material having appropriate ductility.

The reason that the pressure at which the tool presses the sintered bearing is 70 to 700 kPa is as described below.

In the case in which the pressing pressure is less than 70 kPa, since the sintered bearing is unstably held by the tool, the sealing process takes a long time to completely seal both end surfaces. On the other hand, in the case in which the pressing pressure exceeds 700 kPa, since the pressing pressure is too high, the sintered bearing is difficult to vibrate by the high frequency vibration, so that both end surfaces are insufficiently sealed.

The reason that the power and the frequency of the high frequency vibration supplied to the tool are respectively 50 to 3000 W/cm$^2$ and 10 to 50 kHz is as described below.

In the case in which the power is less than 50 W/cm$^2$ and the frequency is less than 10 KHz, since the vibration is insufficient, both end surfaces cannot be sealed completely. On the other hand, in the case in which the power is not less than 50 W/cm$^2$ and the frequency is not less than 10 KHz, both end surfaces can be sealed sufficiently, and as the power and the frequency increase, both end surfaces can be sealed in a short period of time. However, in the case in which the power exceeds 3000 W/cm$^2$ or the frequency exceeds 50 KHz, a remarkable effect of shortening the time cannot be obtained. In addition, in the case in which the power exceeds 3000 W/cm$^2$ and the frequency exceeds 50 KHz, a neck portion which is a constriction portion formed between bonded particles in sintering is damaged, so that roughness of the end surfaces subjected to the sealing process is large. In a serious case, the sintered bearing may be broken.

According to another aspect of the present invention, at least one of the tool and the die preferably has protrusions which are formed on the surfaces thereof abutting the sintered bearing. In this case, when the high frequency vibration is performed under the above conditions, recesses for generating fluid dynamic pressure can be formed on the end surfaces of the sintered bearing while both end surfaces are sealed. Since the end surfaces having the recesses formed in the above manner are sealed together with the recesses, leakage of fluid dynamic pressure through the pores is inhibited during use, and high fluid dynamic pressure effect can be obtained.

EFFECTS OF THE INVENTION

According to the present invention, since both end surfaces of the sintered bearing can be simultaneously sealed by one sealing process, the productivity can be remarkably improved.

Figure 1:
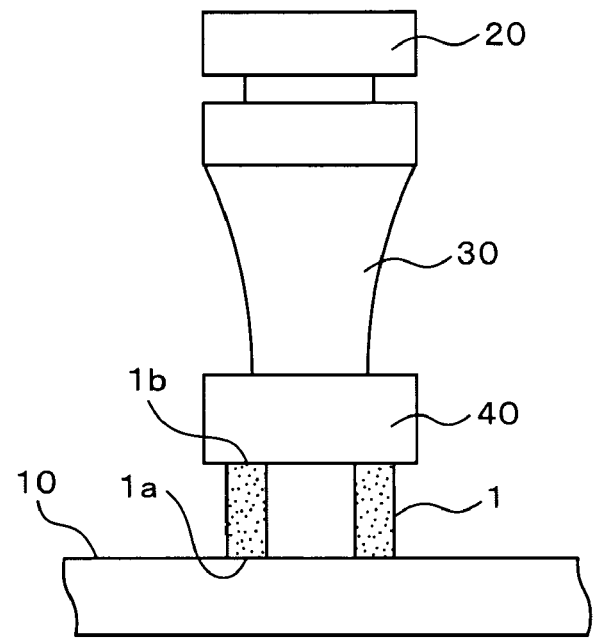
FIG. 1 is a side diagram of a sealing apparatus in one embodiment preferably using the present invention.

EXPLANATION OF REFERENCE NUMERALS 1 denotes a sintered bearing, 1a denotes an end surface of the sintered bearing, 1b denotes the other surface of the sintered bearing, 2 denotes a recess of the sintered bearing, 10 denotes a die, 11 denotes a protrusion of the die, 40 denotes a tool, and 41 denotes a protrusion.

DESCRIPTION OF THE PREFERRED EMBODIMENTS

The embodiments of the present invention will be described hereinafter with reference to the drawings. FIG. 1 shows a sealing apparatus which is preferably used for a production method for an oil-impregnated sintered bearing. The apparatus is an apparatus for sealing both end surfaces of a cylindrical sintered bearing 1, and is equipped with a die 10, a vibrator 20, a horn 30, and a tool 40.

The die 10 is a plate-shaped mounting pedestal having a predetermined thickness, and is strongly secured on, for example, a base (not shown in the Figure) horizontally. The sintered bearing 1 is mounted on the die 10 such that one end surface 1a of the sintered bearing 1 abuts a surface of the die 10. The vibrator 20 is supported so as to be elevated by an elevating device (not shown in the Figure). The horn 30 is mounted on a lower surface of the vibrator 20, and is a conic hollow pipe. An axis of the horn 30 corresponds to a perpendicular direction, a large diameter side of the horn 30 disposed at the upper side, and an end surface of the large diameter side is mounted on the vibrator 20. The disc-shaped tool 40 is coaxially secured on a lower end surface of a small diameter side of the horn 30 by, for example, welding therebetween. When the vibrator 20 is operated, high frequency vibration is generated in an axial direction. In this case, it is desirable that a power of the high frequency vibration supplied to the tool be 50 to 2000 W/cm$^2$, and that a frequency of the high frequency vibration be 10 to 50 kHz.

A diameter of a lower end surface of the tool 40 is larger than an outside diameter of the sintered bearing 1, and an overall end surface of the sintered bearing 1 can abut the lower end surface of the tool 40. The surface of the die 10 has an area much larger than that of the end surface 1a of the sintered bearing 1. The die 10 and the tool 40 are composed of materials such that roughness of the surface of the die 10 and the lower end surface of the tool 40 is not more than 0.4 s, and hardness of the surfaces is not less than HRA60. In particular, the die 10 is preferably composed of a cemented carbide having a hardness of about 950 to 1800 HV since the cemented carbide has ductility so as to be resistant to repeated impacts generated by high frequency vibration. The tool 40 is preferably composed of a material having appropriate ductility in order to prevent cracking in the tool 40 due to high frequency vibration directly supplied to the tool 40.

Next, the actions and the effects of the above sealing apparatus will be explained. First, the sintered bearing 1 is mounted on the die 10 such that the end surface 1a of the sintered bearing 1 abuts the surface of the die 10 which exists directly under the tool 40. Next, by lowering the vibrator 20, the lower end surface of the tool 40 is abutted to the upper surface of the die 10, and by further lowering the vibrator 20, the tool 40 presses the sintered bearing 1 at a predetermined pressure. The pressing pressure is 70 to 700 kPa. While this condition of the sintered bearing 1 is maintained, the vibrator 20 is operated.

When the vibrator 20 is operated, the horn 30 is vibrated at high frequency in the axial direction, so that the high frequency vibration is supplied to the tool 40, and is transmitted from the tool 40 to the sintered bearing 1. As a result, impacts are repeatedly given to an upper end surface 1b of the sintered bearing 1 abutting the tool 40, and are simultaneously repeatedly given to the lower end surface 1a of the sintered bearing 1 abutting the die 10. In this manner, both end surfaces 1a and 1b of the sintered bearing 1 subjected to high frequency vibration process are worked little by little by repeated vibration having high speed and short amplitude, plastic flow of the material of the sintered bearing 1 occurs, and pores exposed on the surfaces of the sintered bearing 1 are sealed.

Various conditions, for example, surface roughness and hardness of the die 10 and the tool 40 which the sintered bearing 1 abuts, the power and the frequency of the high frequency vibration, and the pressure at which the sintered bearing 1 is pressed, are controlled in the above manner, so that both end surfaces 1a and 1b can be sealed sufficiently, and can be mirror-finished surfaces. The time required in the sealing process, that is, the vibration time of the high frequency vibration can be about 0.05 to 5 sec. When this process time passes, the operation of the vibrator 20 is stopped, and the vibrator 20 is raised, so that the tool 40 is separated from the sintered bearing 1, and the sintered bearing 1 is obtained.

Although the vibration time is about 0.05 to 5 seconds as described above, the sealing process takes a short time in the case in which the power of the high frequency vibration is large. On the other hand, the sealing process takes a long time in the case in which the power of the high frequency vibration is small. Therefore, the sealing process time is preferably decided based on the power of the high frequency vibration. Specifically, denoting that Y (sec) is an vibration time of the high frequency vibration and X (W/cm$^2$) is a power of the high frequency vibration, the vibration time Y and the power X preferably satisfy the relationship $Y=A \times X^{-1}$ ($50 \leq A \leq 1000$). In the case in which the factor A is within the above range, good sealing of both end surfaces of the sintered bearing 1 can be obtained such that surface roughness of the sintered bearing 1 is small after the sealing process. In this case, when the factor A is less than 50, since the vibration time is insufficient, complete sealing of both end surfaces of the sintered bearing 1 cannot be obtained. On the other hand, when the factor A exceeds 1000, a neck portion which is a constriction portion formed between bonded particles in sintering is damaged, so that roughness of the end surfaces subjected to the sealing process is large. In a serious case, the sintered bearing 1 may be broken.

According to the embodiment, both end surfaces 1a and 1b of the sintered bearing 1 can be simultaneously sealed by one process, and the period of time for the one sealing process can be remarkably short. Therefore, productivity can be remarkably improved.

Figure 2:
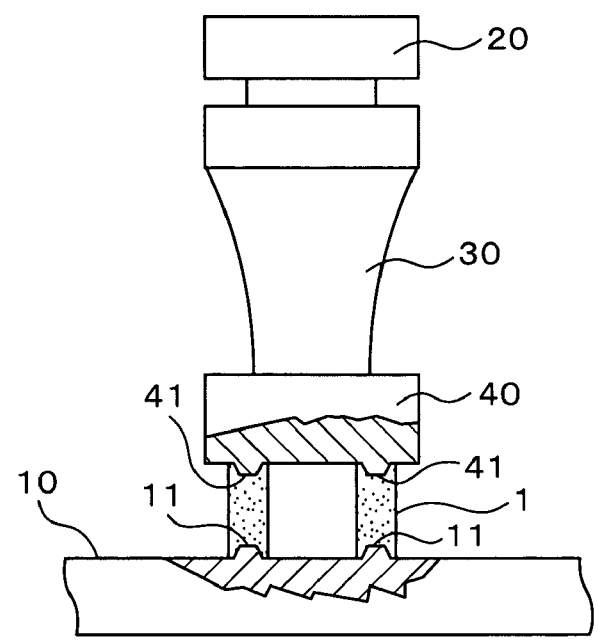
FIG. 2 is a side diagram showing another embodiment of the present invention.

Next, another embodiment of the present invention will be explained with reference to FIG. 2. In a sealing apparatus of another embodiment, plural protrusions 11 are formed on the surface of the die 10, and plural protrusions 41 which are the same as the protrusion portions 11 are formed on the lower end surface of the tool 40. These protrusions 11 and 41 are formed at positions corresponding to the end surfaces 1a and 1b of the sintered bearing 1 subjected to sealing process, extends in a diameter direction, and are radially aligned in a circumferential direction at equal intervals.

Figure 3:
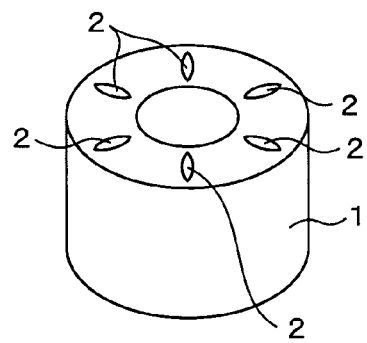
FIG. 3 is a perspective diagram showing an oil-impregnated sintered bearing produced in another embodiment.

In this embodiment, in the same condition as that in the above embodiment, high frequency vibration is supplied to the tool 40 while the sintered bearing 1 is pressed by the tool 40, and so that both end surfaces 1a and 1b are subjected to a sealing process. In this case, both end surfaces 1a and 1b of the sintered bearing 1 are sealed, and the protrusions 11 and 41 are pressed on both end surfaces 1a and 1b, so that recesses 2 are formed thereon as shown in FIG. 3. The insides of the recesses 2 are sealed by the high frequency vibration in the same manner for both end surfaces 1a and 1b. For example, the sintered bearing 1 obtained in the above manner is used such that both end surfaces 1a and 1b receive thrust fluid dynamic pressure and the recesses 2 are used for generating thrust fluid dynamic pressure. In this case, since both end surfaces 1a and 1b including the recesses 2 are sealed, leakage of fluid dynamic pressure through the pores during use is inhibited, and high thrust fluid dynamic pressure effects can be obtained.

Although the recesses 2 are formed on both end surfaces 1a and 1b, the recesses 2 may be formed on one of both end surfaces 1a and 1b. In this case, the tool 40 has the protrusions 41 formed on the lower surface thereof or the die 10 has the protrusions 11 formed on the surface thereof.

EXAMPLES

Next, Examples 1 and 2 of the present invention will be explained hereinafter, and the effects of the present invention will be demonstrated.

1. Example 1

A raw powder having compositions as shown in Table 1 was compacted into a green compact, and the green compact was sintered, so that the required number of cylindrical sintered bearings was obtained. The sintered bearings had a true density ratio of 70%, an outside diameter of 16 mm, and an axial direction length of 5 mm.

TABLE 1

| | | | (mass %) |
|---|---|---|---|
| Cu | Sn | Fe | |
| 52 | 2 | balance | |

Next, both end surfaces of the sintered bearings were sealed in various conditions shown in Table 2 by using a sealing apparatus having the same structure as that shown in FIG. 1, so that Samples 1 to 19 were obtained. Table 2 shows roughness and hardness of surfaces of a die and a tool abutting the sintered bearings, pressures at which the tool presses the sintered bearings, and powers and frequencies of high frequency vibration. Denoting that Y (sec) is an vibration time of the high frequency vibration and X (W/cm$^2$) is a power of the high frequency vibration, sealing process was performed such that the vibration time Y and the power X satisfied the relationship of $Y=500 \times X^{-1}$. An asterisk in Table 2 denotes a value which is out of a value range of the present invention.

Next, sealed conditions of both end surfaces of the Samples were observed by a metallographic microscope, and were evaluated as shown in Table 2. "Good" indicates that "both end surfaces were almost completely sealed", and "NG" indicates that "at least one of end surfaces were insufficiently sealed" or "at least one of end surfaces were damaged to become rough due to excessive sealing process".

TABLE 2

| Sample No. | Surface Roughness (s) | Hardness (HRA) | Pressure (KPa) | Power (W/cm²) | Frequency (Hz) | Evaluation |
|---|---|---|---|---|---|---|
| 1 | 0.5 * | 60 | 300 | 1000 | 30 | NG |
| 2 | 0.4 | 60 | 300 | 1000 | 30 | Good |
| 3 | 0.3 | 60 | 300 | 1000 | 30 | Good |
| 4 | 0.4 | 55 * | 300 | 1000 | 30 | NG |
| 5 | 0.4 | 60 | 300 | 1000 | 30 | Good |
| 6 | 0.4 | 65 | 300 | 1000 | 30 | Good |
| 7 | 0.4 | 60 | 50 * | 1000 | 30 | NG |
| 8 | 0.4 | 60 | 70 | 1000 | 30 | Good |
| 9 | 0.4 | 60 | 700 | 1000 | 30 | Good |
| 10 | 0.4 | 60 | 750 * | 1000 | 30 | NG |
| 11 | 0.4 | 60 | 300 | 40 * | 30 | NG |
| 12 | 0.4 | 60 | 300 | 50 | 30 | Good |
| 13 | 0.4 | 60 | 300 | 100 | 30 | Good |
| 14 | 0.4 | 60 | 300 | 3000 | 30 | Good |
| 15 | 0.4 | 60 | 300 | 3100 * | 30 | NG |
| 16 | 0.4 | 60 | 300 | 1000 | 5 * | NG |
| 17 | 0.4 | 60 | 300 | 1000 | 10 | Good |
| 18 | 0.4 | 60 | 300 | 1000 | 50 | Good |
| 19 | 0.4 | 60 | 300 | 1000 | 60 * | NG |

As shown in Table 2, in the case in which the sealing process was performed in the condition in the range of the present invention, it was confirmed that good sealing of both end surfaces can be obtained such that surface roughness of the sintered bearing is small after the sealing process, but in the case in which the sealing process was performed in the conditions outside the range of the present invention, it was confirmed that at least one of end surfaces were insufficiently sealed or at least one of end surfaces were damaged to get rough due to excessive sealing process. Therefore, it was shown that the present invention is effectively used for sealing of a sintered bearing.

2. Example 2

The same cylindrical sintered bearings as those of the Example 1 were prepared, the sealing apparatus used in the Example 1 was used, and both end surfaces of sintered bearings were sintered in various conditions such that powers and vibration times of high frequency vibration varied as shown in Table 3, so that Samples 20 to 48 were obtained. Roughness of surfaces of the die and the tool used in the Example 2 was 0.4 s, hardness of the surfaces was HRA60, pressures at which the tool pressed the sintered bearings were 300 kPa, and frequencies of the high frequency vibration were 30 kHz.

Figure 4:
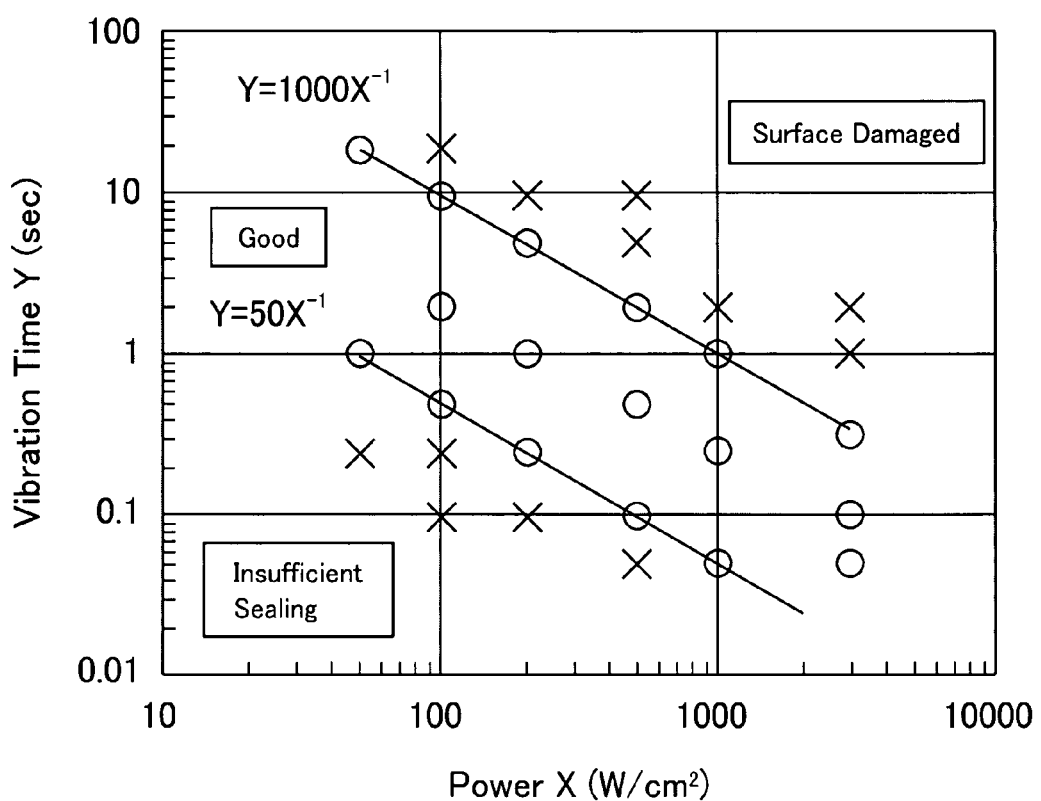
FIG. 4 is a graph showing the relationships of the power X of high frequency vibration and vibration time Y of high frequency vibration.

Next, sealed conditions of both end surfaces of the Samples obtained in the above manner were observed by a metallographic microscope, and were evaluated as shown in Table 3, and were graphed in a graph of FIG. 4. Evaluation standards indicated by "Good" and "NG" are the same as in the Example 1.

TABLE 3

| Sample No. | Power (W/cm²) | Vibration Time (sec) | Factor A | Evaluation |
|---|---|---|---|---|
| 20 | 50 | 0.5 | 25* | NG |
| 21 | 50 | 1.0 | 50 | Good |
| 22 | 50 | 20.0 | 1000 | Good |
| 23 | 100 | 0.1 | 10* | NG |
| 24 | 100 | 0.25 | 25* | NG |
| 25 | 100 | 0.5 | 50 | Good |
| 26 | 100 | 2.0 | 200 | Good |
| 27 | 100 | 10.0 | 1000 | Good |
| 28 | 100 | 20.0 | 2000* | NG |
| 29 | 200 | 0.1 | 20* | NG |
| 30 | 200 | 0.25 | 50 | Good |
| 31 | 200 | 1.0 | 200 | Good |
| 32 | 200 | 5.0 | 1000 | Good |
| 33 | 200 | 10.0 | 2000* | NG |
| 34 | 500 | 0.05 | 25* | NG |
| 35 | 500 | 0.1 | 50 | Good |
| 36 | 500 | 0.5 | 250 | Good |
| 37 | 500 | 2.0 | 1000 | Good |
| 38 | 500 | 5.0 | 2500* | NG |
| 39 | 500 | 10.0 | 5000* | NG |
| 40 | 1000 | 0.05 | 50 | NG |
| 41 | 1000 | 0.25 | 250 | Good |
| 42 | 1000 | 1.0 | 1000 | Good |
| 43 | 1000 | 2.0 | 2000* | NG |
| 44 | 3000 | 0.05 | 150 | Good |
| 45 | 3000 | 0.1 | 300 | Good |
| 46 | 3000 | 0.3 | 900 | Good |
| 47 | 3000 | 1.0 | 3000* | NG |
| 48 | 3000 | 2.0 | 6000* | NG |

As shown in Table 3 and FIG. 4, in the case in which the sealing process was performed such that the vibration time Y and the power X satisfied the relationship $Y=A \times X^{-1}$ and the factor A was in a range of the present invention of 50 to 1000, denoting that Y (sec) is an vibration time of the high frequency vibration and X (W/cm²) is a power of the high frequency vibration, it was confirmed that good sealing of both end surfaces can be obtained such that surface roughness of the sintered bearing is small. On the other hand, in the case in which the sealing process was performed such that the factor A was out of the range of the present invention of 50 to 1000, it was confirmed that at least one of end surfaces were insufficiently sealed or at least one of end surfaces were damaged to become rough due to excessive sealing process. Therefore, it was shown that the present invention is effective when used for sealing a sintered bearing.

What is claimed is:

1. A production method for an oil-impregnated sintered bearing, comprising:

abutting one end surface of the sintered bearing on a die so as to mount the sintered bearing thereon and abutting a tool on the other end surface of the sintered bearing, the one end surface and the other end of the sintered bearing having pores;

supplying high frequency vibration to the tool so as to give repeated impacts to the one end surface and the other end surface of the sintered bearing while pressing the sintered bearing by the tool in the above condition of the sintered bearing, so that the pores of the one end surface and the other end surface are sealed, wherein the die and the tool have surfaces abutting the sintered bearing, and the surfaces have roughness of not more than 0.4 s and hardness of not less than HRA 60, and the tool presses the sintered bearing at a pressure of 70 to 700 kPa, and the high frequency vibration supplied to the tool has a power of 50 to 3000 W/cm², a frequency of 10 to 50 kHz and satisfies the relationship $Y=A*X^{-1}$, with Y being the vibration time (sec), X being the power (W/cm$^2$), and constant A being in the range of $50 \leq A \leq 1000$.

2. A production method for an oil-impregnated sintered bearing according to claim 1, wherein the sintered bearing has an axis, and the high frequency vibration is supplied to the tool toward one direction selected from a direction parallel to the axis, a direction substantially perpendicular to the axis, and a circumferential direction around the axis.

3. A production method for an oil-impregnated sintered bearing according to claim 1, wherein the tool has a protrusion which is formed on the surface of the tool abutting the other end surface of the sintered bearing, and the production method further comprises forming a recess for generating fluid dynamic pressure on the other end surface of the sintered bearing by pressing the protrusion of the tool thereon.

4. A production method for an oil-impregnated sintered bearing according to claim 1, wherein the die has a protrusion formed on the surface of the die abutting the one end surface of the sintered bearing, and the production method further comprises forming a recess for generating fluid dynamic pressure on the end surface of the sintered bearing by pressing the protrusion of the die on the sintered bearing.

5. A production method for an oil-impregnated sintered bearing according to claim 1, wherein the die is made of a cemented carbide.

* * * * *